(12) United States Patent
Siemiet et al.

(10) Patent No.: US 7,926,975 B2
(45) Date of Patent: Apr. 19, 2011

(54) LIGHT DISTRIBUTION USING A LIGHT EMITTING DIODE ASSEMBLY

(75) Inventors: Dennis Siemiet, Rochester Hills, MI (US); John Ivey, Farmington Hills, MI (US); Francis Palazzolo, Sterling Heights, MI (US)

(73) Assignee: Altair Engineering, Inc., Troy, MI (US)

( * ) Notice: Subject to any disclaimer, the term of this patent is extended or adjusted under 35 U.S.C. 154(b) by 0 days.

(21) Appl. No.: 12/724,645

(22) Filed: Mar. 16, 2010

(65) Prior Publication Data
US 2010/0172149 A1    Jul. 8, 2010

Related U.S. Application Data

(63) Continuation of application No. 11/962,995, filed on Dec. 21, 2007, now Pat. No. 7,712,918.

(51) Int. Cl.
*F21V 1/00* (2006.01)
*F21V 7/04* (2006.01)

(52) U.S. Cl. .................. 362/240; 362/246; 362/555

(58) Field of Classification Search .................. 362/240, 362/241, 242, 246, 247, 249.02, 260, 311.02, 362/555
See application file for complete search history.

(56) References Cited

U.S. PATENT DOCUMENTS

| | | | |
|---|---|---|---|
| 54,511 A | 2/1920 | Owen | |
| 58,105 A | 6/1921 | Poritz | |
| 79,814 A | 8/1929 | Hoch | |
| 80,419 A | 1/1930 | Kramer | |
| 84,763 A | 7/1931 | Stange | |
| D119,797 S | 4/1940 | Winkler et al. | |
| D125,312 S | 2/1941 | Logan | |
| 2,909,097 A | 10/1959 | Aiden et al. | |
| 3,318,185 A | 5/1967 | Kott | |
| 3,561,719 A | 2/1971 | Grindle | |
| 3,586,936 A | 6/1971 | McLeroy | |
| 3,601,621 A | 8/1971 | Ritchie | |
| 3,612,855 A | 10/1971 | Juhnke | |
| 3,643,088 A | 2/1972 | Osteen et al. | |
| 3,746,918 A | 7/1973 | Drucker et al. | |

(Continued)

FOREIGN PATENT DOCUMENTS

CN    1584388    2/2005

(Continued)

OTHER PUBLICATIONS

Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.

(Continued)

*Primary Examiner* — Y My Quach Lee
(74) *Attorney, Agent, or Firm* — Young Basile

(57) ABSTRACT

A fluorescent light tube retrofit with light emitting diodes (LEDs) that evenly distribute light to avoid bright spots is disclosed. One LED lighting unit includes a tubular housing and a plurality of LED assemblies mounted about a circumference of the tubular housing. LEDs face inward from a mounting surface that is angled offset of the tube. Alternatively, at least one LED can be oriented to emit light parallel to a tangent of the housing into a light pipe that curves inside at least a portion of the tubular housing.

19 Claims, 3 Drawing Sheets

U.S. PATENT DOCUMENTS

| | | |
|---|---|---|
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 3,993,386 A | 11/1976 | Rowe |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,102,558 A | 7/1978 | Krachman |
| 4,107,581 A | 8/1978 | Abernethy |
| 4,189,663 A | 2/1980 | Schmutzer et al. |
| 4,211,955 A | 7/1980 | Ray |
| 4,241,295 A | 12/1980 | Williams, Jr. |
| 4,271,408 A | 6/1981 | Teshima et al. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,367,464 A | 1/1983 | Kurahashi et al. |
| D268,134 S | 3/1983 | Zurcher |
| 4,382,272 A | 5/1983 | Quella et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,394,719 A | 7/1983 | Moberg |
| 4,420,711 A | 12/1983 | Takahashi et al. |
| 4,455,562 A | 6/1984 | Dolan et al. |
| 4,500,796 A | 2/1985 | Quin |
| 4,581,687 A | 4/1986 | Nakanishi |
| 4,597,033 A | 6/1986 | Meggs et al. |
| 4,600,972 A | 7/1986 | MacIntyre |
| 4,607,317 A | 8/1986 | Lin |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,656,398 A | 4/1987 | Michael et al. |
| 4,661,890 A | 4/1987 | Watanabe et al. |
| 4,668,895 A | 5/1987 | Schneiter |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,698,730 A | 10/1987 | Sakai et al. |
| 4,701,669 A | 10/1987 | Head et al. |
| 4,705,406 A | 11/1987 | Havel |
| 4,707,141 A | 11/1987 | Havel |
| D293,723 S | 1/1988 | Buttner |
| 4,727,289 A | 2/1988 | Uchida |
| 4,740,882 A | 4/1988 | Miller |
| 4,748,545 A | 5/1988 | Schmitt |
| 4,753,148 A | 6/1988 | Johnson |
| 4,758,173 A | 7/1988 | Northrop |
| 4,771,274 A | 9/1988 | Havel |
| 4,780,621 A | 10/1988 | Bartleucci et al. |
| 4,794,383 A | 12/1988 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,894,832 A | 1/1990 | Colak |
| 4,901,207 A | 2/1990 | Sato et al. |
| 4,912,371 A | 3/1990 | Hamilton |
| 4,922,154 A | 5/1990 | Cacoub |
| 4,934,852 A | 6/1990 | Havel |
| 4,941,072 A | 7/1990 | Yasumoto et al. |
| 4,943,900 A | 7/1990 | Gartner |
| 4,962,687 A | 10/1990 | Belliveau et al. |
| 4,965,561 A | 10/1990 | Havel |
| 4,973,835 A | 11/1990 | Kurosu et al. |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,018,054 A | 5/1991 | Ohashi et al. |
| 5,027,037 A | 6/1991 | Wei |
| 5,027,262 A | 6/1991 | Freed |
| 5,034,807 A | 7/1991 | Von Kohorn |
| 5,036,248 A | 7/1991 | McEwan et al. |
| 5,038,255 A | 8/1991 | Nishihashi et al. |
| 5,065,226 A | 11/1991 | Kluitmans et al. |
| 5,072,216 A | 12/1991 | Grange |
| 5,078,039 A | 1/1992 | Tulk et al. |
| 5,083,063 A | 1/1992 | Brooks |
| 5,088,013 A | 2/1992 | Revis |
| 5,089,748 A | 2/1992 | Ihms |
| 5,103,382 A | 4/1992 | Kondo et al. |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,140,220 A | 8/1992 | Hasegawa |
| 5,142,199 A | 8/1992 | Elwell |
| 5,151,679 A | 9/1992 | Dimmick |
| 5,154,641 A | 10/1992 | McLaughlin |
| 5,161,879 A | 11/1992 | McDermott |
| 5,164,715 A | 11/1992 | Kashiwabara et al. |
| 5,184,114 A | 2/1993 | Brown |
| 5,194,854 A | 3/1993 | Havel |
| 5,198,756 A | 3/1993 | Jenkins et al. |
| 5,209,560 A | 5/1993 | Taylor et al. |
| 5,220,250 A | 6/1993 | Szuba |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,303,124 A | 4/1994 | Wrobel |
| 5,307,295 A | 4/1994 | Taylor et al. |
| 5,321,593 A | 6/1994 | Moates |
| 5,323,226 A | 6/1994 | Schreder |
| 5,329,431 A | 7/1994 | Taylor et al. |
| 5,344,068 A | 9/1994 | Haessig |
| 5,350,977 A | 9/1994 | Hamamoto et al. |
| 5,357,170 A | 10/1994 | Luchaco et al. |
| 5,371,618 A | 12/1994 | Tai et al. |
| 5,374,876 A | 12/1994 | Horibata et al. |
| 5,375,043 A | 12/1994 | Tokunaga |
| D354,360 S | 1/1995 | Murata |
| 5,381,074 A | 1/1995 | Rudzewicz et al. |
| 5,388,357 A | 2/1995 | Malita |
| 5,402,702 A | 4/1995 | Hata |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,430,356 A | 7/1995 | Ference et al. |

| | | | | | | |
|---|---|---|---|---|---|---|
| 5,432,408 | A | 7/1995 | Matsuda et al. | 5,907,742 | A | 5/1999 | Johnson et al. |
| 5,436,535 | A | 7/1995 | Yang | 5,912,653 | A | 6/1999 | Fitch |
| 5,436,853 | A | 7/1995 | Shimohara | 5,921,660 | A | 7/1999 | Yu |
| 5,450,301 | A | 9/1995 | Waltz et al. | 5,924,784 | A | 7/1999 | Chliwnyj et al. |
| 5,461,188 | A | 10/1995 | Drago et al. | 5,927,845 | A | 7/1999 | Gustafson et al. |
| 5,463,280 | A | 10/1995 | Johnson | 5,946,209 | A | 8/1999 | Eckel et al. |
| 5,465,144 | A | 11/1995 | Parker et al. | 5,949,347 | A | 9/1999 | Wu |
| 5,475,300 | A | 12/1995 | Havel | 5,952,680 | A | 9/1999 | Strite |
| 5,489,827 | A | 2/1996 | Xia | 5,959,547 | A | 9/1999 | Tubel et al. |
| 5,491,402 | A | 2/1996 | Small | 5,962,989 | A | 10/1999 | Baker |
| 5,493,183 | A | 2/1996 | Kimball | 5,962,992 | A | 10/1999 | Huang et al. |
| 5,504,395 | A | 4/1996 | Johnson et al. | 5,963,185 | A | 10/1999 | Havel |
| 5,513,082 | A | 4/1996 | Asano | 5,974,553 | A | 10/1999 | Gandar |
| 5,519,496 | A | 5/1996 | Borgert et al. | 5,980,064 | A | 11/1999 | Metroyanis |
| 5,530,322 | A | 6/1996 | Ference et al. | 5,998,928 | A | 12/1999 | Hipp |
| 5,544,809 | A | 8/1996 | Keating et al. | 6,007,209 | A | 12/1999 | Pelka |
| 5,545,950 | A | 8/1996 | Cho | 6,008,783 | A | 12/1999 | Kitagawa et al. |
| 5,550,440 | A | 8/1996 | Allison et al. | 6,011,691 | A | 1/2000 | Schreffler |
| 5,559,681 | A | 9/1996 | Duarte | 6,016,038 | A | 1/2000 | Mueller et al. |
| 5,561,346 | A | 10/1996 | Byrne | 6,018,237 | A | 1/2000 | Havel |
| D376,030 | S | 11/1996 | Cohen | 6,020,825 | A | 2/2000 | Chansky et al. |
| 5,575,459 | A | 11/1996 | Anderson | 6,025,550 | A | 2/2000 | Kato |
| 5,575,554 | A | 11/1996 | Guritz | 6,028,694 | A | 2/2000 | Schmidt |
| 5,581,158 | A | 12/1996 | Quazi | 6,030,099 | A | 2/2000 | McDermott |
| 5,592,051 | A | 1/1997 | Korkala | 6,031,343 | A | 2/2000 | Recknagel et al. |
| 5,607,227 | A | 3/1997 | Yasumoto et al. | D422,737 | S | 4/2000 | Orozco |
| 5,608,290 | A | 3/1997 | Hutchisson et al. | 6,068,383 | A | 5/2000 | Robertson et al. |
| 5,614,788 | A | 3/1997 | Mullins et al. | 6,069,597 | A | 5/2000 | Hansen |
| 5,621,282 | A | 4/1997 | Haskell | 6,072,280 | A | 6/2000 | Allen |
| 5,621,603 | A | 4/1997 | Adamec et al. | 6,084,359 | A | 7/2000 | Hetzel et al. |
| 5,621,662 | A | 4/1997 | Humphries et al. | 6,091,200 | A | 7/2000 | Lenz |
| 5,622,423 | A | 4/1997 | Lee | 6,092,915 | A | 7/2000 | Rensch |
| 5,633,629 | A | 5/1997 | Hochstein | 6,095,661 | A | 8/2000 | Lebens et al. |
| 5,634,711 | A | 6/1997 | Kennedy et al. | 6,097,352 | A | 8/2000 | Zavracky et al. |
| 5,640,061 | A | 6/1997 | Bornhorst et al. | 6,121,875 | A | 9/2000 | Hamm et al. |
| 5,640,141 | A | 6/1997 | Myllymaki | 6,127,783 | A | 10/2000 | Pashley et al. |
| 5,642,129 | A | 6/1997 | Zavracky et al. | 6,132,072 | A | 10/2000 | Turnbull et al. |
| 5,655,830 | A | 8/1997 | Ruskouski | 6,135,604 | A | 10/2000 | Lin |
| 5,656,935 | A | 8/1997 | Havel | 6,139,174 | A | 10/2000 | Butterworth |
| 5,661,645 | A | 8/1997 | Hochstein | 6,149,283 | A | 11/2000 | Conway et al. |
| 5,673,059 | A | 9/1997 | Zavracky et al. | 6,150,774 | A | 11/2000 | Mueller et al. |
| 5,682,103 | A | 10/1997 | Burrell | 6,151,529 | A | 11/2000 | Batko |
| 5,688,042 | A | 11/1997 | Madadi et al. | 6,158,882 | A | 12/2000 | Bischoff, Jr. |
| 5,697,695 | A | 12/1997 | Lin et al. | 6,166,496 | A | 12/2000 | Lys et al. |
| 5,701,058 | A | 12/1997 | Roth | 6,175,201 | B1 | 1/2001 | Sid |
| 5,712,650 | A | 1/1998 | Barlow | 6,175,220 | B1 | 1/2001 | Billig et al. |
| 5,721,471 | A | 2/1998 | Begemann et al. | 6,181,126 | B1 | 1/2001 | Havel |
| 5,725,148 | A | 3/1998 | Hartman | 6,183,086 | B1 | 2/2001 | Neubert |
| 5,726,535 | A | 3/1998 | Yan | 6,183,104 | B1 | 2/2001 | Ferrara |
| 5,731,759 | A | 3/1998 | Finucan | 6,184,628 | B1 | 2/2001 | Ruthenberg |
| 5,734,590 | A | 3/1998 | Tebbe | 6,196,471 | B1 | 3/2001 | Ruthenberg |
| 5,751,118 | A | 5/1998 | Mortimer | 6,211,626 | B1 | 4/2001 | Lys et al. |
| 5,752,766 | A | 5/1998 | Bailey et al. | 6,215,409 | B1 | 4/2001 | Blach |
| 5,765,940 | A | 6/1998 | Levy et al. | 6,217,190 | B1 | 4/2001 | Altman et al. |
| 5,769,527 | A | 6/1998 | Taylor et al. | 6,219,239 | B1 | 4/2001 | Mellberg et al. |
| 5,784,006 | A | 7/1998 | Hochstein | 6,227,679 | B1 | 5/2001 | Zhang et al. |
| 5,790,329 | A | 8/1998 | Klaus et al. | 6,241,359 | B1 | 6/2001 | Lin |
| 5,803,579 | A | 9/1998 | Turnbull et al. | 6,250,774 | B1 | 6/2001 | Begemann et al. |
| 5,803,580 | A | 9/1998 | Tseng | 6,252,350 | B1 | 6/2001 | Alvarez |
| 5,803,729 | A | 9/1998 | Tsimerman | 6,252,358 | B1 | 6/2001 | Xydis et al. |
| 5,808,689 | A | 9/1998 | Small | 6,268,600 | B1 | 7/2001 | Nakamura et al. |
| 5,810,463 | A | 9/1998 | Kawahara et al. | 6,273,338 | B1 | 8/2001 | White |
| 5,812,105 | A | 9/1998 | Van de Ven | 6,275,397 | B1 | 8/2001 | McClain |
| 5,813,751 | A | 9/1998 | Shaffer | 6,283,612 | B1 | 9/2001 | Hunter |
| 5,813,753 | A | 9/1998 | Vriens et al. | 6,292,901 | B1 | 9/2001 | Lys et al. |
| 5,821,695 | A | 10/1998 | Vilanilam et al. | 6,293,684 | B1 | 9/2001 | Riblett |
| 5,825,051 | A | 10/1998 | Bauer et al. | 6,297,724 | B1 | 10/2001 | Bryans et al. |
| 5,828,178 | A | 10/1998 | York et al. | 6,305,109 | B1 | 10/2001 | Lee |
| 5,836,676 | A | 11/1998 | Ando et al. | 6,305,821 | B1 | 10/2001 | Hsieh et al. |
| 5,848,837 | A | 12/1998 | Gustafson | 6,307,331 | B1 | 10/2001 | Bonasia et al. |
| 5,850,126 | A | 12/1998 | Kanbar | 6,310,590 | B1 | 10/2001 | Havel |
| 5,851,063 | A | 12/1998 | Doughty et al. | 6,323,832 | B1 | 11/2001 | Nishizawa et al. |
| 5,852,658 | A | 12/1998 | Knight et al. | 6,325,651 | B1 | 12/2001 | Nishihara et al. |
| 5,854,542 | A | 12/1998 | Forbes | 6,334,699 | B1 | 1/2002 | Gladnick |
| RE36,030 | E | 1/1999 | Nadeau | 6,340,868 | B1 | 1/2002 | Lys et al. |
| 5,859,508 | A | 1/1999 | Ge et al. | 6,354,714 | B1 | 3/2002 | Rhodes |
| 5,865,529 | A | 2/1999 | Yan | 6,361,186 | B1 | 3/2002 | Slayden |
| 5,890,794 | A | 4/1999 | Abtahi et al. | 6,369,525 | B1 | 4/2002 | Chang et al. |
| 5,896,010 | A | 4/1999 | Mikolajczak et al. | 6,371,637 | B1 | 4/2002 | Atchinson et al. |

| | | |
|---|---|---|
| 6,373,733 B1 | 4/2002 | Wu et al. |
| 6,379,022 B1 | 4/2002 | Amerson et al. |
| D457,667 S | 5/2002 | Piepgras et al. |
| D457,669 S | 5/2002 | Piepgras et al. |
| D457,974 S | 5/2002 | Piepgras et al. |
| 6,394,623 B1 | 5/2002 | Tsui |
| D458,395 S | 6/2002 | Piepgras et al. |
| 6,400,096 B1 | 6/2002 | Wells et al. |
| 6,404,131 B1 | 6/2002 | Kawano et al. |
| 6,411,022 B1 | 6/2002 | Machida |
| 6,422,716 B2 | 7/2002 | Henrici et al. |
| 6,428,189 B1 | 8/2002 | Hochstein |
| D463,610 S | 9/2002 | Piepgras et al. |
| 6,445,139 B1 | 9/2002 | Marshall et al. |
| 6,448,550 B1 | 9/2002 | Nishimura |
| 6,448,716 B1 | 9/2002 | Hutchison |
| 6,459,919 B1 | 10/2002 | Lys et al. |
| 6,469,457 B2 | 10/2002 | Callahan |
| 6,471,388 B1 | 10/2002 | Marsh |
| 6,472,823 B2 | 10/2002 | Yen |
| 6,473,002 B1 | 10/2002 | Hutchison |
| D468,035 S | 12/2002 | Blanc et al. |
| 6,488,392 B1 | 12/2002 | Lu |
| 6,495,964 B1 | 12/2002 | Muthu et al. |
| 6,527,411 B1 | 3/2003 | Sayers |
| 6,528,954 B1 | 3/2003 | Lys et al. |
| 6,528,958 B2 | 3/2003 | Hulshof et al. |
| 6,538,375 B1 | 3/2003 | Duggal et al. |
| 6,548,967 B1 | 4/2003 | Dowling et al. |
| 6,573,536 B1 | 6/2003 | Dry |
| 6,577,072 B2 | 6/2003 | Saito et al. |
| 6,577,080 B2 | 6/2003 | Lys et al. |
| 6,577,512 B2 | 6/2003 | Tripathi et al. |
| 6,577,794 B1 | 6/2003 | Currie et al. |
| 6,578,979 B2 | 6/2003 | Truttmann-Bättig |
| 6,582,103 B1 | 6/2003 | Popovich et al. |
| 6,583,550 B2 | 6/2003 | Iwasa et al. |
| 6,583,573 B2 | 6/2003 | Bierman |
| 6,586,890 B2 | 7/2003 | Min et al. |
| 6,592,238 B2 | 7/2003 | Cleaver et al. |
| 6,596,977 B2 | 7/2003 | Muthu et al. |
| 6,598,996 B1 | 7/2003 | Lodhie |
| 6,608,453 B2 | 8/2003 | Morgan et al. |
| 6,608,614 B1 | 8/2003 | Johnson |
| 6,609,804 B2 | 8/2003 | Nolan et al. |
| 6,612,712 B2 | 9/2003 | Nepil |
| 6,612,717 B2 | 9/2003 | Yen |
| 6,612,729 B1 * | 9/2003 | Hoffman ................. 362/555 |
| 6,621,222 B1 | 9/2003 | Hong |
| 6,623,151 B2 | 9/2003 | Pederson |
| 6,624,597 B2 | 9/2003 | Dowling et al. |
| D481,484 S | 10/2003 | Cuevas et al. |
| 6,634,770 B2 | 10/2003 | Cao |
| 6,634,779 B2 | 10/2003 | Reed |
| 6,636,003 B2 | 10/2003 | Rahm et al. |
| 6,639,349 B1 | 10/2003 | Bahadur |
| 6,641,284 B2 | 11/2003 | Stopa et al. |
| 6,659,622 B2 | 12/2003 | Katogi et al. |
| 6,660,935 B2 | 12/2003 | Southard et al. |
| 6,666,689 B1 | 12/2003 | Savage, Jr. |
| 6,667,623 B2 | 12/2003 | Bourgault et al. |
| 6,674,096 B2 | 1/2004 | Sommers |
| 6,676,284 B1 | 1/2004 | Willson |
| 6,679,621 B2 | 1/2004 | West et al. |
| 6,681,154 B2 | 1/2004 | Nierlich et al. |
| 6,682,205 B2 | 1/2004 | Lin |
| 6,683,419 B2 | 1/2004 | Kriparos |
| 6,700,136 B2 | 3/2004 | Guida |
| 6,712,486 B1 | 3/2004 | Popovich et al. |
| 6,717,376 B2 | 4/2004 | Lys et al. |
| 6,717,526 B2 | 4/2004 | Martineau et al. |
| 6,720,745 B2 | 4/2004 | Lys et al. |
| 6,726,348 B2 | 4/2004 | Gloisten |
| 6,741,324 B1 | 5/2004 | Kim |
| D491,678 S | 6/2004 | Piepgras |
| D492,042 S | 6/2004 | Piepgras |
| 6,744,223 B2 | 6/2004 | Laflamme et al. |
| 6,748,299 B1 | 6/2004 | Motoyama |
| 6,762,562 B2 | 7/2004 | Leong |
| 6,774,584 B2 | 8/2004 | Lys et al. |
| 6,777,891 B2 | 8/2004 | Lys et al. |
| 6,781,329 B2 | 8/2004 | Mueller et al. |
| 6,787,999 B2 | 9/2004 | Stimac et al. |
| 6,788,000 B2 | 9/2004 | Appelberg et al. |
| 6,788,011 B2 | 9/2004 | Mueller et al. |
| 6,791,840 B2 | 9/2004 | Chun |
| 6,801,003 B2 | 10/2004 | Schanberger et al. |
| 6,806,659 B1 | 10/2004 | Mueller et al. |
| 6,814,470 B2 | 11/2004 | Rizkin et al. |
| 6,815,724 B2 | 11/2004 | Dry |
| 6,846,094 B2 | 1/2005 | Luk |
| 6,851,816 B2 | 2/2005 | Wu et al. |
| 6,851,832 B2 | 2/2005 | Tieszen |
| 6,853,151 B2 | 2/2005 | Leong et al. |
| 6,853,563 B1 | 2/2005 | Yang et al. |
| 6,857,924 B2 | 2/2005 | Fu et al. |
| 6,860,628 B2 | 3/2005 | Robertson et al. |
| 6,866,401 B2 | 3/2005 | Sommers et al. |
| 6,869,204 B2 | 3/2005 | Morgan et al. |
| 6,871,981 B2 | 3/2005 | Alexanderson et al. |
| 6,874,924 B1 | 4/2005 | Hulse et al. |
| 6,879,883 B1 | 4/2005 | Motoyama |
| 6,882,111 B2 | 4/2005 | Kan et al. |
| 6,883,929 B2 | 4/2005 | Dowling |
| 6,883,934 B2 | 4/2005 | Kawakami et al. |
| 6,888,322 B2 | 5/2005 | Dowling et al. |
| 6,897,624 B2 | 5/2005 | Lys et al. |
| 6,909,239 B2 | 6/2005 | Gauna |
| 6,909,921 B1 | 6/2005 | Bilger |
| 6,918,680 B2 | 7/2005 | Seeberger |
| 6,921,181 B2 | 7/2005 | Yen |
| 6,936,968 B2 | 8/2005 | Cross et al. |
| 6,936,978 B2 | 8/2005 | Morgan et al. |
| 6,940,230 B2 | 9/2005 | Myron et al. |
| 6,948,829 B2 | 9/2005 | Verdes et al. |
| 6,964,501 B2 | 11/2005 | Ryan |
| 6,965,197 B2 | 11/2005 | Tyan et al. |
| 6,965,205 B2 | 11/2005 | Piepgras et al. |
| 6,967,448 B2 | 11/2005 | Morgan et al. |
| 6,969,179 B2 | 11/2005 | Sloan et al. |
| 6,969,186 B2 | 11/2005 | Sonderegger et al. |
| 6,969,954 B2 | 11/2005 | Lys |
| 6,975,079 B2 | 12/2005 | Lys et al. |
| 6,979,097 B2 | 12/2005 | Elam et al. |
| 6,982,518 B2 | 1/2006 | Chou et al. |
| 6,995,681 B2 | 2/2006 | Pederson |
| 6,997,576 B1 | 2/2006 | Lodhie et al. |
| 7,004,603 B2 | 2/2006 | Knight |
| D518,218 S | 3/2006 | Roberge et al. |
| 7,008,079 B2 | 3/2006 | Smith |
| 7,014,336 B1 | 3/2006 | Ducharme et al. |
| 7,015,650 B2 | 3/2006 | McGrath |
| 7,018,063 B2 | 3/2006 | Michael et al. |
| 7,021,799 B2 | 4/2006 | Mizuyoshi |
| 7,021,809 B2 | 4/2006 | Iwasa et al. |
| 7,024,256 B2 | 4/2006 | Krzyzanowski et al. |
| 7,031,920 B2 | 4/2006 | Dowling et al. |
| 7,033,036 B2 | 4/2006 | Pederson |
| 7,038,398 B1 | 5/2006 | Lys et al. |
| 7,038,399 B2 | 5/2006 | Lys et al. |
| 7,042,172 B2 | 5/2006 | Dowling et al. |
| 7,048,423 B2 | 5/2006 | Stepanenko et al. |
| 7,049,761 B2 | 5/2006 | Timmermans et al. |
| 7,052,171 B1 | 5/2006 | Lefebvre et al. |
| 7,053,557 B2 | 5/2006 | Cross et al. |
| 7,064,498 B2 | 6/2006 | Dowling et al. |
| 7,064,674 B2 | 6/2006 | Pederson |
| 7,067,992 B2 | 6/2006 | Leong et al. |
| 7,077,978 B2 | 7/2006 | Setlur et al. |
| 7,080,927 B2 | 7/2006 | Feuerborn et al. |
| 7,086,747 B2 | 8/2006 | Nielson et al. |
| 7,088,014 B2 | 8/2006 | Nierlich et al. |
| 7,088,904 B2 | 8/2006 | Ryan, Jr. |
| 7,102,902 B1 | 9/2006 | Brown et al. |
| 7,113,541 B1 | 9/2006 | Lys et al. |
| 7,114,830 B2 | 10/2006 | Robertson et al. |
| 7,114,834 B2 | 10/2006 | Rivas et al. |
| 7,118,262 B2 | 10/2006 | Negley |

| | | |
|---|---|---|
| 7,119,503 B2 | 10/2006 | Kemper |
| 7,121,679 B2 | 10/2006 | Fujimoto |
| 7,122,976 B1 | 10/2006 | Null et al. |
| 7,128,442 B2 | 10/2006 | Lee et al. |
| 7,128,454 B2 | 10/2006 | Kim et al. |
| D532,532 S | 11/2006 | Maxik |
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,144,135 B2 | 12/2006 | Martin et al. |
| 7,153,002 B2 | 12/2006 | Kim et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,164,110 B2 | 1/2007 | Pitigoi-Aron et al. |
| 7,165,863 B1 | 1/2007 | Thomas et al. |
| 7,165,866 B2 | 1/2007 | Li |
| 7,167,777 B2 | 1/2007 | Budike, Jr. |
| 7,168,843 B2 | 1/2007 | Striebel |
| D536,468 S | 2/2007 | Crosby |
| 7,178,941 B2 | 2/2007 | Roberge et al. |
| 7,180,252 B2 | 2/2007 | Lys et al. |
| D538,950 S | 3/2007 | Maxik |
| D538,952 S | 3/2007 | Maxik et al. |
| D538,962 S | 3/2007 | Elliott |
| 7,186,003 B2 | 3/2007 | Dowling et al. |
| 7,186,005 B2 | 3/2007 | Hulse |
| 7,187,141 B2 | 3/2007 | Mueller et al. |
| 7,190,126 B1 | 3/2007 | Paton |
| 7,192,154 B2 | 3/2007 | Becker |
| 7,201,491 B2 | 4/2007 | Bayat et al. |
| 7,201,497 B2 | 4/2007 | Weaver, Jr. et al. |
| 7,202,613 B2 | 4/2007 | Morgan et al. |
| 7,204,615 B2 | 4/2007 | Arik et al. |
| 7,204,622 B2 | 4/2007 | Dowling et al. |
| 7,207,696 B1 | 4/2007 | Lin |
| 7,210,818 B2 | 5/2007 | Luk et al. |
| 7,210,957 B2 | 5/2007 | Mrakovich |
| 7,211,959 B1 | 5/2007 | Chou |
| 7,213,934 B2 | 5/2007 | Zarian et al. |
| 7,217,012 B2 | 5/2007 | Southard et al. |
| 7,217,022 B2 | 5/2007 | Ruffin |
| 7,218,056 B1 | 5/2007 | Harwood |
| 7,218,238 B2 | 5/2007 | Right et al. |
| 7,220,015 B2 | 5/2007 | Dowling |
| 7,221,104 B2 | 5/2007 | Lys et al. |
| 7,221,110 B2 | 5/2007 | Sears et al. |
| 7,224,000 B2 | 5/2007 | Aanegola et al. |
| 7,226,189 B2 | 6/2007 | Lee et al. |
| 7,228,052 B1 | 6/2007 | Lin |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,236,366 B2 | 6/2007 | Chen |
| 7,237,924 B2 | 7/2007 | Martineau et al. |
| 7,237,925 B2 | 7/2007 | Mayer et al. |
| 7,239,532 B1 | 7/2007 | Hsu et al. |
| 7,241,038 B2 | 7/2007 | Naniwa et al. |
| 7,242,152 B2 | 7/2007 | Dowling et al. |
| 7,246,926 B2 | 7/2007 | Harwood |
| 7,246,931 B2 | 7/2007 | Hsieh et al. |
| 7,248,239 B2 | 7/2007 | Dowling et al. |
| 7,249,269 B1 | 7/2007 | Motoyama |
| 7,249,865 B2 | 7/2007 | Robertson |
| D548,868 S | 8/2007 | Roberge et al. |
| 7,252,408 B2 | 8/2007 | Mazzochette et al. |
| 7,253,566 B2 | 8/2007 | Lys et al. |
| 7,255,457 B2 | 8/2007 | Ducharme et al. |
| 7,255,460 B2 | 8/2007 | Lee |
| 7,256,554 B2 | 8/2007 | Lys |
| 7,258,458 B2 | 8/2007 | Mochiachvili et al. |
| 7,258,467 B2 | 8/2007 | Saccomanno et al. |
| 7,259,528 B2 | 8/2007 | Pilz |
| 7,262,439 B2 | 8/2007 | Setlur et al. |
| 7,264,372 B2 | 9/2007 | Maglica |
| 7,267,467 B2 | 9/2007 | Wu et al. |
| 7,270,443 B2 | 9/2007 | Kurtz et al. |
| 7,271,794 B1 | 9/2007 | Cheng et al. |
| 7,273,300 B2 | 9/2007 | Mrakovich |
| 7,274,045 B2 | 9/2007 | Chandran et al. |
| 7,274,160 B2 | 9/2007 | Mueller et al. |
| D553,267 S | 10/2007 | Yuen |
| 7,285,801 B2 | 10/2007 | Eliashevich et al. |
| 7,288,902 B1 | 10/2007 | Melanson |
| 7,296,912 B2 | 11/2007 | Beauchamp |
| 7,300,184 B2 | 11/2007 | Ichikawa et al. |
| 7,300,192 B2 | 11/2007 | Mueller et al. |
| D556,937 S | 12/2007 | Ly |
| D557,854 S | 12/2007 | Lewis |
| 7,303,300 B2 | 12/2007 | Dowling et al. |
| 7,306,353 B2 | 12/2007 | Popovich et al. |
| 7,307,391 B2 | 12/2007 | Shan |
| 7,308,296 B2 | 12/2007 | Lys et al. |
| 7,309,965 B2 | 12/2007 | Dowling et al. |
| 7,318,658 B2 | 1/2008 | Wang et al. |
| 7,319,244 B2 | 1/2008 | Liu et al. |
| 7,319,246 B2 | 1/2008 | Soules et al. |
| 7,321,191 B2 | 1/2008 | Setlur et al. |
| 7,326,964 B2 | 2/2008 | Lim et al. |
| 7,329,031 B2 | 2/2008 | Liaw et al. |
| D563,589 S | 3/2008 | Hariri et al. |
| 7,345,320 B2 | 3/2008 | Dahm |
| 7,348,604 B2 | 3/2008 | Matheson |
| 7,350,936 B2 | 4/2008 | Ducharme et al. |
| 7,350,952 B2 | 4/2008 | Nishigaki |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,358,679 B2 | 4/2008 | Lys et al. |
| 7,358,929 B2 | 4/2008 | Mueller et al. |
| 7,374,327 B2 | 5/2008 | Schexnaider |
| 7,385,359 B2 | 6/2008 | Dowling et al. |
| 7,391,159 B2 | 6/2008 | Harwood |
| 7,396,146 B2 | 7/2008 | Wang |
| 7,401,935 B2 | 7/2008 | VanderSchuit |
| 7,401,945 B2 | 7/2008 | Zhang |
| 7,427,840 B2 | 9/2008 | Morgan et al. |
| 7,429,117 B2 | 9/2008 | Pohlert et al. |
| 7,438,441 B2 | 10/2008 | Sun et al. |
| 7,449,847 B2 | 11/2008 | Schanberger et al. |
| 7,476,004 B2 | 1/2009 | Chan |
| 7,478,924 B2 | 1/2009 | Robertson |
| 7,490,957 B2 | 2/2009 | Leong et al. |
| 7,497,596 B2 | 3/2009 | Ge |
| 7,507,001 B2 | 3/2009 | Kit |
| 7,510,299 B2 | 3/2009 | Timmermans et al. |
| 7,521,872 B2 | 4/2009 | Bruning |
| 7,524,089 B2 | 4/2009 | Park |
| 7,534,002 B2 | 5/2009 | Yamaguchi et al. |
| 7,549,769 B2 | 6/2009 | Kim et al. |
| 7,556,396 B2 | 7/2009 | Kuo et al. |
| 7,572,030 B2 | 8/2009 | Booth et al. |
| 7,575,339 B2 | 8/2009 | Hung |
| 7,619,366 B2 | 11/2009 | Diederiks |
| 7,635,201 B2 | 12/2009 | Deng |
| 2001/0033488 A1 | 10/2001 | Chliwnyj et al. |
| 2001/0045803 A1 | 11/2001 | Cencur |
| 2002/0038157 A1 | 3/2002 | Dowling et al. |
| 2002/0044066 A1 | 4/2002 | Dowling et al. |
| 2002/0047569 A1 | 4/2002 | Dowling et al. |
| 2002/0047624 A1 | 4/2002 | Stam et al. |
| 2002/0047628 A1 | 4/2002 | Morgan et al. |
| 2002/0048169 A1 | 4/2002 | Dowling et al. |
| 2002/0057061 A1 | 5/2002 | Mueller et al. |
| 2002/0060526 A1 | 5/2002 | Timmermans et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0152298 A1 | 10/2002 | Kikta et al. |

| | | | | | | |
|---|---|---|---|---|---|---|
| 2002/0153851 A1 | 10/2002 | Morgan et al. | | 2005/0162093 A1 | 7/2005 | Timmermans et al. |
| 2002/0158583 A1 | 10/2002 | Lys et al. | | 2005/0174473 A1 | 8/2005 | Morgan et al. |
| 2002/0163316 A1 | 11/2002 | Lys et al. | | 2005/0174780 A1 | 8/2005 | Park |
| 2002/0171365 A1 | 11/2002 | Morgan et al. | | 2005/0184667 A1 | 8/2005 | Sturman et al. |
| 2002/0171377 A1 | 11/2002 | Mueller et al. | | 2005/0201112 A1 | 9/2005 | Machi et al. |
| 2002/0171378 A1 | 11/2002 | Morgan et al. | | 2005/0206529 A1 | 9/2005 | St.-Germain |
| 2002/0176259 A1 | 11/2002 | Ducharme | | 2005/0213320 A1 | 9/2005 | Kazuhiro et al. |
| 2002/0179816 A1 | 12/2002 | Haines et al. | | 2005/0213352 A1 | 9/2005 | Lys |
| 2002/0195975 A1 | 12/2002 | Schanberger et al. | | 2005/0213353 A1 | 9/2005 | Lys |
| 2003/0011538 A1 | 1/2003 | Lys et al. | | 2005/0218838 A1 | 10/2005 | Lys |
| 2003/0028260 A1 | 2/2003 | Blackwell | | 2005/0218870 A1 | 10/2005 | Lys |
| 2003/0031015 A1 | 2/2003 | Ishibashi | | 2005/0219860 A1 | 10/2005 | Schexnaider |
| 2003/0057884 A1 | 3/2003 | Dowling et al. | | 2005/0219872 A1 | 10/2005 | Lys |
| 2003/0057886 A1 | 3/2003 | Lys et al. | | 2005/0225979 A1 | 10/2005 | Robertson et al. |
| 2003/0057887 A1 | 3/2003 | Dowling et al. | | 2005/0231133 A1 | 10/2005 | Lys |
| 2003/0057890 A1 | 3/2003 | Lys et al. | | 2005/0236029 A1 | 10/2005 | Dowling |
| 2003/0076281 A1 | 4/2003 | Morgan et al. | | 2005/0236998 A1 | 10/2005 | Mueller et al. |
| 2003/0085710 A1 | 5/2003 | Bourgault et al. | | 2005/0248299 A1 | 11/2005 | Chemel et al. |
| 2003/0095404 A1 | 5/2003 | Becks et al. | | 2005/0253533 A1 | 11/2005 | Lys et al. |
| 2003/0100837 A1 | 5/2003 | Lys et al. | | 2005/0259424 A1 | 11/2005 | Zampini, II et al. |
| 2003/0102810 A1 | 6/2003 | Cross et al. | | 2005/0265019 A1 | 12/2005 | Sommers et al. |
| 2003/0133292 A1 | 7/2003 | Mueller et al. | | 2005/0275626 A1 | 12/2005 | Mueller et al. |
| 2003/0137258 A1 | 7/2003 | Piepgras et al. | | 2005/0276051 A1 | 12/2005 | Caudle et al. |
| 2003/0185005 A1 | 10/2003 | Sommers et al. | | 2005/0276053 A1 | 12/2005 | Nortrup et al. |
| 2003/0185014 A1 | 10/2003 | Gloisten | | 2005/0276064 A1 | 12/2005 | Wu et al. |
| 2003/0189412 A1 | 10/2003 | Cunningham | | 2005/0285547 A1 | 12/2005 | Piepgras et al. |
| 2003/0222587 A1 | 12/2003 | Dowling, Jr. et al. | | 2006/0002110 A1 | 1/2006 | Dowling et al. |
| 2004/0003545 A1 | 1/2004 | Gillespie | | 2006/0012987 A9 | 1/2006 | Ducharme et al. |
| 2004/0012959 A1 | 1/2004 | Robertson et al. | | 2006/0012997 A1 | 1/2006 | Catalano et al. |
| 2004/0036006 A1 | 2/2004 | Dowling | | 2006/0016960 A1 | 1/2006 | Morgan et al. |
| 2004/0037088 A1 | 2/2004 | English et al. | | 2006/0022214 A1 | 2/2006 | Morgan et al. |
| 2004/0052076 A1 | 3/2004 | Mueller et al. | | 2006/0028155 A1 | 2/2006 | Young |
| 2004/0062041 A1 | 4/2004 | Cross et al. | | 2006/0028837 A1 | 2/2006 | Mrakovich |
| 2004/0075572 A1 | 4/2004 | Buschmann et al. | | 2006/0034078 A1 | 2/2006 | Kovacik et al. |
| 2004/0080960 A1 | 4/2004 | Wu | | 2006/0050509 A9 | 3/2006 | Dowling et al. |
| 2004/0090191 A1 | 5/2004 | Mueller et al. | | 2006/0050514 A1 | 3/2006 | Opolka |
| 2004/0090787 A1 | 5/2004 | Dowling et al. | | 2006/0076908 A1 | 4/2006 | Morgan et al. |
| 2004/0105261 A1 | 6/2004 | Ducharme et al. | | 2006/0092640 A1 | 5/2006 | Li |
| 2004/0113568 A1 | 6/2004 | Dowling et al. | | 2006/0098077 A1 | 5/2006 | Dowling |
| 2004/0116039 A1 | 6/2004 | Mueller et al. | | 2006/0104058 A1 | 5/2006 | Chemel et al. |
| 2004/0124782 A1 | 7/2004 | Yu | | 2006/0109648 A1 | 5/2006 | Trenchard et al. |
| 2004/0130908 A1* | 7/2004 | McClurg et al. ............... 362/555 | | 2006/0109649 A1 | 5/2006 | Ducharme et al. |
| 2004/0130909 A1 | 7/2004 | Mueller et al. | | 2006/0109661 A1 | 5/2006 | Coushaine et al. |
| 2004/0141321 A1 | 7/2004 | Dowling et al. | | 2006/0126325 A1 | 6/2006 | Lefebvre et al. |
| 2004/0155609 A1 | 8/2004 | Lys et al. | | 2006/0132061 A1 | 6/2006 | McCormick et al. |
| 2004/0160199 A1 | 8/2004 | Morgan et al. | | 2006/0132323 A1 | 6/2006 | Grady, Jr. |
| 2004/0178751 A1 | 9/2004 | Mueller et al. | | 2006/0146531 A1 | 7/2006 | Reo et al. |
| 2004/0189218 A1 | 9/2004 | Leong et al. | | 2006/0152172 A9 | 7/2006 | Mueller et al. |
| 2004/0189262 A1 | 9/2004 | McGrath | | 2006/0158881 A1 | 7/2006 | Dowling |
| 2004/0212320 A1 | 10/2004 | Dowling et al. | | 2006/0170376 A1 | 8/2006 | Piepgras et al. |
| 2004/0212321 A1 | 10/2004 | Lys et al. | | 2006/0192502 A1 | 8/2006 | Brown et al. |
| 2004/0212993 A1 | 10/2004 | Morgan et al. | | 2006/0193131 A1 | 8/2006 | McGrath et al. |
| 2004/0223328 A1 | 11/2004 | Lee et al. | | 2006/0197661 A1 | 9/2006 | Tracy et al. |
| 2004/0240890 A1 | 12/2004 | Lys et al. | | 2006/0198128 A1 | 9/2006 | Piepgras et al. |
| 2004/0257007 A1 | 12/2004 | Lys et al. | | 2006/0208667 A1 | 9/2006 | Lys et al. |
| 2005/0013133 A1 | 1/2005 | Yeh | | 2006/0221606 A1 | 10/2006 | Dowling et al. |
| 2005/0024877 A1 | 2/2005 | Frederick | | 2006/0221619 A1 | 10/2006 | Nishigaki |
| 2005/0030744 A1 | 2/2005 | Ducharme et al. | | 2006/0232974 A1 | 10/2006 | Lee et al. |
| 2005/0035728 A1 | 2/2005 | Schanberger et al. | | 2006/0262516 A9 | 11/2006 | Dowling et al. |
| 2005/0036300 A1 | 2/2005 | Dowling et al. | | 2006/0262521 A1 | 11/2006 | Piepgras et al. |
| 2005/0040774 A1 | 2/2005 | Mueller et al. | | 2006/0262544 A1 | 11/2006 | Piepgras et al. |
| 2005/0041161 A1 | 2/2005 | Dowling et al. | | 2006/0262545 A1 | 11/2006 | Piepgras et al. |
| 2005/0041424 A1 | 2/2005 | Ducharme | | 2006/0273741 A1 | 12/2006 | Stalker, III |
| 2005/0043907 A1 | 2/2005 | Eckel et al. | | 2006/0274529 A1 | 12/2006 | Cao |
| 2005/0044617 A1 | 3/2005 | Mueller et al. | | 2006/0285325 A1 | 12/2006 | Ducharme et al. |
| 2005/0047132 A1 | 3/2005 | Dowling et al. | | 2007/0035255 A1 | 2/2007 | Shuster et al. |
| 2005/0047134 A1 | 3/2005 | Mueller et al. | | 2007/0040516 A1 | 2/2007 | Chen |
| 2005/0062440 A1 | 3/2005 | Lys et al. | | 2007/0041220 A1 | 2/2007 | Lynch |
| 2005/0063194 A1 | 3/2005 | Lys et al. | | 2007/0047227 A1 | 3/2007 | Ducharme |
| 2005/0078477 A1 | 4/2005 | Lo | | 2007/0053182 A1 | 3/2007 | Robertson |
| 2005/0099824 A1 | 5/2005 | Dowling et al. | | 2007/0053208 A1 | 3/2007 | Justel et al. |
| 2005/0107694 A1 | 5/2005 | Jansen et al. | | 2007/0064419 A1 | 3/2007 | Gandhi |
| 2005/0110384 A1 | 5/2005 | Peterson | | 2007/0070621 A1 | 3/2007 | Rivas et al. |
| 2005/0116667 A1 | 6/2005 | Mueller et al. | | 2007/0070631 A1 | 3/2007 | Huang et al. |
| 2005/0128751 A1 | 6/2005 | Roberge et al. | | 2007/0081423 A1 | 4/2007 | Chien |
| 2005/0141225 A1 | 6/2005 | Striebel | | 2007/0086754 A1 | 4/2007 | Lys et al. |
| 2005/0151489 A1 | 7/2005 | Lys et al. | | 2007/0086912 A1 | 4/2007 | Dowling et al. |
| 2005/0151663 A1 | 7/2005 | Tanguay | | 2007/0097678 A1 | 5/2007 | Yang |
| 2005/0154494 A1 | 7/2005 | Ahmed | | 2007/0115658 A1 | 5/2007 | Mueller et al. |

| | | | |
|---|---|---|---|
| 2007/0115665 A1 | 5/2007 | Mueller et al. |
| 2007/0120594 A1 | 5/2007 | Balakrishnan et al. |
| 2007/0127234 A1 | 6/2007 | Jervey, III |
| 2007/0133202 A1 | 6/2007 | Huang et al. |
| 2007/0139938 A1 | 6/2007 | Petroski et al. |
| 2007/0145915 A1 | 6/2007 | Roberge et al. |
| 2007/0147046 A1 | 6/2007 | Arik et al. |
| 2007/0152797 A1 | 7/2007 | Chemel et al. |
| 2007/0153514 A1 | 7/2007 | Dowling et al. |
| 2007/0159828 A1 | 7/2007 | Wang |
| 2007/0165402 A1 | 7/2007 | Weaver, Jr. et al. |
| 2007/0173978 A1 | 7/2007 | Fein et al. |
| 2007/0177382 A1 | 8/2007 | Pritchard et al. |
| 2007/0182387 A1 | 8/2007 | Weirich |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0195527 A1 | 8/2007 | Russell |
| 2007/0195532 A1 | 8/2007 | Reisenauer et al. |
| 2007/0205712 A1 | 9/2007 | Radkov et al. |
| 2007/0206375 A1 | 9/2007 | Piepgras et al. |
| 2007/0211463 A1 | 9/2007 | Chevalier et al. |
| 2007/0228999 A1 | 10/2007 | Kit |
| 2007/0235751 A1 | 10/2007 | Radkov et al. |
| 2007/0236156 A1 | 10/2007 | Lys et al. |
| 2007/0237284 A1 | 10/2007 | Lys et al. |
| 2007/0240346 A1 | 10/2007 | Li et al. |
| 2007/0241657 A1 | 10/2007 | Radkov et al. |
| 2007/0242466 A1 | 10/2007 | Wu et al. |
| 2007/0247842 A1 | 10/2007 | Zampini et al. |
| 2007/0247847 A1 | 10/2007 | Villard |
| 2007/0247851 A1 | 10/2007 | Villard |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0274070 A1 | 11/2007 | Wedell |
| 2007/0281520 A1 | 12/2007 | Insalaco et al. |
| 2007/0285926 A1 | 12/2007 | Maxik |
| 2007/0285933 A1 | 12/2007 | Southard et al. |
| 2007/0290625 A1 | 12/2007 | He et al. |
| 2007/0291483 A1 | 12/2007 | Lys |
| 2008/0003664 A1 | 1/2008 | Tysoe et al. |
| 2008/0007945 A1 | 1/2008 | Kelly et al. |
| 2008/0012502 A1 | 1/2008 | Lys |
| 2008/0012506 A1 | 1/2008 | Mueller et al. |
| 2008/0013316 A1 | 1/2008 | Chiang |
| 2008/0013324 A1 | 1/2008 | Yu |
| 2008/0018261 A1 | 1/2008 | Kastner |
| 2008/0037245 A1 | 2/2008 | Chan |
| 2008/0037284 A1 | 2/2008 | Rudisill |
| 2008/0062680 A1 | 3/2008 | Timmermans et al. |
| 2008/0089075 A1 | 4/2008 | Hsu |
| 2008/0092800 A1 | 4/2008 | Smith et al. |
| 2008/0093615 A1 | 4/2008 | Lin et al. |
| 2008/0093998 A1 | 4/2008 | Dennery et al. |
| 2008/0094837 A1 | 4/2008 | Dobbins et al. |
| 2008/0130267 A1 | 6/2008 | Dowling et al. |
| 2008/0158871 A1 | 7/2008 | McAvoy et al. |
| 2008/0158887 A1 | 7/2008 | Zhu et al. |
| 2008/0164826 A1 | 7/2008 | Lys |
| 2008/0164827 A1 | 7/2008 | Lys |
| 2008/0164854 A1 | 7/2008 | Lys |
| 2008/0175003 A1 | 7/2008 | Tsou et al. |
| 2008/0180036 A1 | 7/2008 | Garrity et al. |
| 2008/0186704 A1 | 8/2008 | Chou et al. |
| 2008/0192436 A1 | 8/2008 | Peng et al. |
| 2008/0211419 A1 | 9/2008 | Garrity |
| 2008/0224629 A1 | 9/2008 | Melanson |
| 2008/0224636 A1 | 9/2008 | Melanson |
| 2008/0253125 A1 | 10/2008 | Kang et al. |
| 2008/0258647 A1 | 10/2008 | Scianna |
| 2008/0285257 A1 | 11/2008 | King |
| 2008/0290814 A1 | 11/2008 | Leong et al. |
| 2008/0315784 A1 | 12/2008 | Tseng |
| 2009/0002995 A1 | 1/2009 | Lee et al. |
| 2009/0016063 A1 | 1/2009 | Hu |
| 2009/0046473 A1 | 2/2009 | Tsai et al. |
| 2009/0052186 A1 | 2/2009 | Xue |
| 2009/0086492 A1 | 4/2009 | Meyer |
| 2009/0091938 A1 | 4/2009 | Jacobson et al. |
| 2009/0185373 A1 | 7/2009 | Grajcar |
| 2009/0303720 A1 | 12/2009 | McGrath |

FOREIGN PATENT DOCUMENTS

| | | |
|---|---|---|
| CN | 1584388 A | 2/2005 |
| CN | 2766345 Y | 3/2006 |
| CN | 2766345 Y | 3/2006 |
| CN | 2869556 | 2/2007 |
| CN | 2869556 Y | 2/2007 |
| EP | 0013782 B1 | 3/1983 |
| EP | 0091172 A2 | 10/1983 |
| EP | 0124924 B1 | 9/1987 |
| EP | 0174699 B1 | 11/1988 |
| EP | 0197602 B1 | 11/1990 |
| EP | 0214701 B1 | 3/1992 |
| EP | 0262713 B1 | 6/1992 |
| EP | 0203668 B1 | 2/1993 |
| EP | 0272749 B1 | 8/1993 |
| EP | 0337567 B1 | 11/1993 |
| EP | 0390262 B1 | 12/1993 |
| EP | 0359329 B1 | 3/1994 |
| EP | 0403011 B1 | 4/1994 |
| EP | 0432848 B1 | 4/1995 |
| EP | 0403001 B1 | 8/1995 |
| EP | 0525876 B1 | 5/1996 |
| EP | 0714556 B1 | 1/1999 |
| EP | 0458408 B1 | 9/1999 |
| EP | 0578302 B1 | 9/1999 |
| EP | 0723701 B1 | 1/2000 |
| EP | 0787419 B1 | 5/2001 |
| EP | 1195740 A2 | 4/2002 |
| EP | 1016062 B1 | 8/2002 |
| EP | 1195740 A3 | 1/2003 |
| EP | 1149510 B1 | 2/2003 |
| EP | 1056993 B1 | 3/2003 |
| EP | 0766436 B1 | 5/2003 |
| EP | 0924281 B1 | 5/2003 |
| EP | 0826167 B1 | 6/2003 |
| EP | 1147686 B1 | 1/2004 |
| EP | 1142452 B1 | 3/2004 |
| EP | 1145602 B1 | 3/2004 |
| EP | 1422975 A1 | 5/2004 |
| EP | 0890059 B1 | 6/2004 |
| EP | 1348319 B1 | 6/2005 |
| EP | 1037862 B1 | 7/2005 |
| EP | 1346609 B1 | 8/2005 |
| EP | 1321012 B1 | 12/2005 |
| EP | 1610593 A2 | 12/2005 |
| EP | 1415517 B1 | 5/2006 |
| EP | 1415518 B1 | 5/2006 |
| EP | 1438877 B1 | 5/2006 |
| EP | 1166604 B1 | 6/2006 |
| EP | 1479270 B1 | 7/2006 |
| EP | 1348318 B1 | 8/2006 |
| EP | 1399694 B1 | 8/2006 |
| EP | 1461980 B1 | 10/2006 |
| EP | 1110120 B1 | 4/2007 |
| EP | 1440604 B1 | 4/2007 |
| EP | 1047903 B1 | 6/2007 |
| EP | 1500307 B1 | 6/2007 |
| EP | 0922305 B1 | 8/2007 |
| EP | 0922306 B1 | 8/2007 |
| EP | 1194918 B1 | 8/2007 |
| EP | 1048085 B1 | 11/2007 |
| EP | 1763650 B1 | 12/2007 |
| EP | 1337784 B1 | 6/2009 |
| JP | 6-54103 U | 7/1994 |
| JP | 7-249467 | 9/1995 |
| JP | 11-135274 A | 5/1999 |
| JP | 2001-238272 A | 8/2001 |
| JP | 2002-141555 A | 5/2002 |
| JP | 3098271 U | 5/2002 |
| JP | 2004-335426 | 11/2004 |
| JP | 2005-158363 A | 6/2005 |
| JP | 2005-166617 A | 6/2005 |
| JP | 2005-347214 A | 12/2005 |
| JP | 2006-507641 A | 3/2006 |

| | | | |
|---|---|---|---|
| KR | 10-2004-0008244 A | 1/2004 |
| KR | 20-0430022 Y1 | 11/2006 |
| KR | 10-0781652 B1 | 12/2007 |
| WO | 99/10867 A1 | 3/1999 |
| WO | 99/31560 A2 | 6/1999 |
| WO | 00/01067 A2 | 1/2000 |
| WO | 02/25842 A2 | 3/2002 |
| WO | 02/061330 A2 | 8/2002 |
| WO | 02/069306 A2 | 9/2002 |
| WO | 02/091805 A2 | 11/2002 |
| WO | 02/098182 A2 | 12/2002 |
| WO | 02/099780 A2 | 12/2002 |
| WO | 03/026358 A1 | 3/2003 |
| WO | 03/055273 A2 | 7/2003 |
| WO | 03/067934 A2 | 8/2003 |
| WO | 03/090890 A1 | 11/2003 |
| WO | 03/096761 A1 | 11/2003 |
| WO | 2004/021747 A2 | 3/2004 |
| WO | 2004/023850 A2 | 3/2004 |
| WO | 2004/032572 A2 | 4/2004 |
| WO | 2004/100624 A2 | 11/2004 |
| WO | 2005/052751 A2 | 6/2005 |
| WO | 2005/060309 A2 | 6/2005 |
| WO | 2005/084339 A2 | 9/2005 |
| WO | 2005/089293 A2 | 9/2005 |
| WO | 2005/089309 A2 | 9/2005 |
| WO | 2006/023149 A2 | 3/2006 |
| WO | 2006/093889 A2 | 9/2006 |
| WO | 2006/127666 A2 | 11/2006 |
| WO | 2006/127785 A2 | 11/2006 |
| WO | 2006/133272 A2 | 12/2006 |
| WO | 2007/081674 A1 | 7/2007 |
| WO | 2007/094810 A2 | 8/2007 |

OTHER PUBLICATIONS

EXPERIMENT Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.
TRUCK-LITE, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.
TRUCK-LITE, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.
TRUCK-LITE, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.
TELECITE Products & Services—Display Options, [online], [retrieved on Jan. 13, 2000] Retrieved from Telecite Web page using Internet <URL: http://www.telecite.com/en/products/optionsen.htm>.
Traffic Signal Products—Transportation Products Group, [online], [retrieved on Jan. 13, 2000] Retrieved from the Dialight Web Page using Internet <URL: http://www.dialight.com/trans.htm>.
LED Lights, Replacement LED lamps for any incandescent light, [online], [retrieved on Jan. 13, 2000] Retrieved from LED Lights Web Page using Internet <URL: http://www.ledlights.com/replac.htm>.
LEDTRONICS, LEDTRONICS Catalog, 1996, p. 10, LEDTRONICS, Torrance, California.
Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi_qu3922/is_200005/ai_n8899499/>.
Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.
Phason Electronic Control Systems, Light Level Controller (LLC) case study. Nov. 30, 2004. 3 pages, Phason Inc., Winnipeg, Manitoba, Canada.
Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.
Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT_Archive/BNP_GUID_9-5-2006_A_10000000000000056772>.
Lawrence Berkeley National Labratory. Lighting Control System—Phase Cut Carrier. University of California, [online] [retrieved on Jan. 14, 2008] Retrieved from Lawrence Berkeley National Labratory web page using Internet <URL: http://www.lbl.gov/tt/techs/lbnl1871.html>.
D.N.A.-111, [online], [retrieved Mar. 10, 2009] Retrieved from the PLC Lighting Web Page using Internet <URL:http://www.plclighting.com/product_info.php?cPath=1&products_id=92>.
E22201-44 Esprit Collection, [online], [retrieved on Jul. 10, 2010] Retrieved from ET2 Contemporary Lighting using Internet <URL:http://www.et2online.com/proddetail.aspx?ItemID=E22201-44>.
E20116-18 Larmes Collection, [online], [retrieved on Jul. 10, 2010] Retrieved from ET2 Contemporary Lighting using Internet <URL:http://www.et2online.com/proddetail.aspx?ItemID=E20116-18>.
E20112-22 Starburst Collection, [online], [retrieved on Jul. 10, 2010] Retrieved from ET2 Contemporary Lighting using Internet <URL:http://www.et2online.com/proddetail.aspx?ItemID=E20112-22>.
E20743-09 Stealth Collection, [online], [retrieved on Jul. 10, 2010] Retrieved from ET2 Contemporary Lighting using Internet <URL:http://www.et2online.com/proddetail.aspx?ItemID=E20743-09>.
E20524-10 &E20525-10 Curva Collection, [online], [retrieved on Jul. 10, 2010] Retrieved from ET2 Contemporary Lighting using Internet <URL:http://www.et2online.com/proddetail.aspx?ItemID=E20524-10&E20525-10>.

* cited by examiner

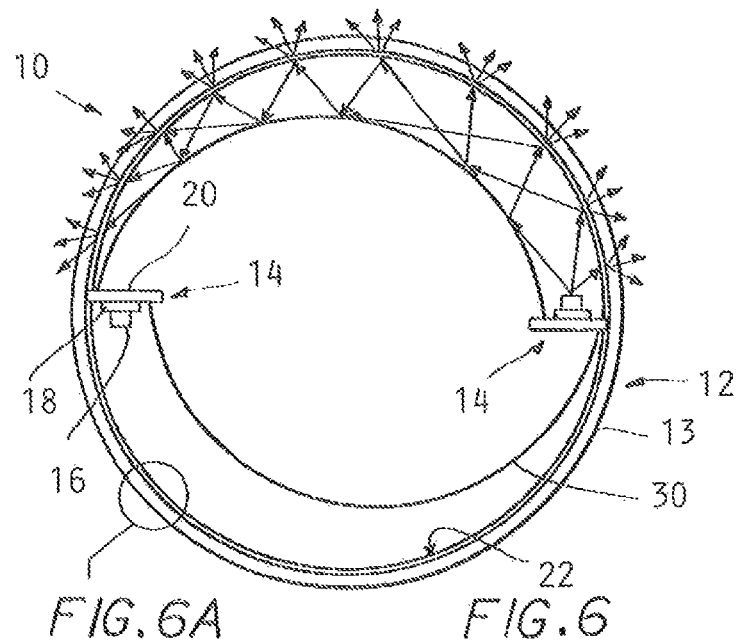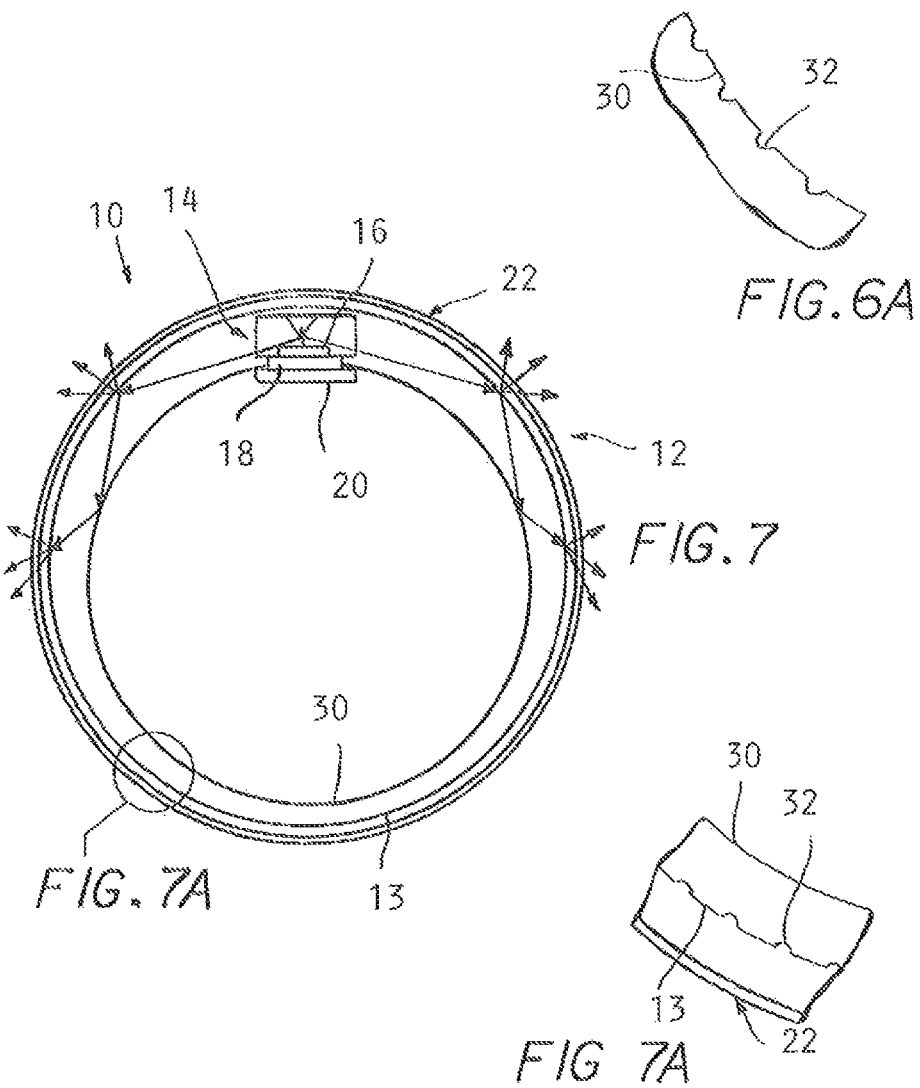

LIGHT DISTRIBUTION USING A LIGHT EMITTING DIODE ASSEMBLY

CROSS-REFERENCE TO RELATED APPLICATION

This application is a continuation of U.S. patent application Ser. No. 11/962,995, filed Dec. 21, 2007, now U.S. Pat. No. 7,712,918.

TECHNICAL FIELD

The present invention relates to a light emitting diode (LED) assembly, and more specifically, to a LED assembly that can replace a conventional fluorescent light in a conventional fluorescent light fixture.

BACKGROUND

Light emitting diodes (LEDs) have many advantages over fluorescent lights. LEDs are more efficient, last longer, and are less sensitive to vibrations and low temperatures. To take advantage of the benefits of LEDs, conventional fluorescent light tubes have been retrofit to include LEDs. For example, U.S. Pat. No. 7,049,761 discloses a tube having the shape of a conventional fluorescent light tube encasing a group of LEDs. Known fluorescent light tubes retrofit with LEDs are constrained by the directional light output of the LEDs, in contrast to the uniform non-directional light output of fluorescent tubes.

BRIEF SUMMARY

The present invention teaches LEDs in various orientations to evenly distribute light around the circumference and along the length of a tube, resulting in even lighting without obvious point sources of light. One such configuration includes a first LED assembly and a second LED assembly, each having a plurality of LEDs. A tube includes at least one tube portion, and the first and second LED assemblies are attached to longitudinal lengths of the tube portion and are oriented to face the interior of the tube. The areas of the tube that receive the least amount of light from each LED assembly receive light from multiple LED assemblies, while the sections of the tube that receive the greatest amount of light from each LED assembly only receive light from one LED assembly. Thus, in the aggregate, a similar amount of light strikes the tube around its entire circumference and along its entire length.

Another such configuration includes, for example, a tubular housing including at least one tube portion and at least one LED assembly including a plurality of LEDs. Each LED assembly is mounted to a longitudinal length of the tubular housing and is oriented to emit light parallel to a tangent of the tubular housing. This configuration also includes a light pipe associated with each LED assembly and curving inside at least a portion of the tubular housing.

Details of these embodiments, and others, are described in further detail hereinafter.

BRIEF DESCRIPTION OF THE DRAWINGS

The description herein makes reference to the accompanying drawings wherein like reference numerals refer to like parts throughout the several views, and wherein:

FIG. 6 is a side view of a tube with two radially mounted LED assemblies and two light pipes to direct light around an arc of the tube;

FIG. 6A is a partial fragmentary view of FIG. 6;

FIG. 7 is a side view of a tube with a side-emitting LED and a light pipe; and

FIG. 7A is a partial fragmentary view of FIG. 7.

DETAILED DESCRIPTION OF EMBODIMENTS OF THE INVENTION

Known fluorescent light tubes retrofit with LEDs distribute light directly toward objects to be illuminated. However, distributing light directly toward objects to be illuminated can result in harsh, uneven light and the appearance of bright spots due to the narrow viewing angle of LEDs. In contrast, embodiments of a linear distribution light emitting diode assembly that provide even light are disclosed herein. By placing LEDs in certain orientations, the appearance of bright spots is overcome, and even light is provided.

Figure 1:
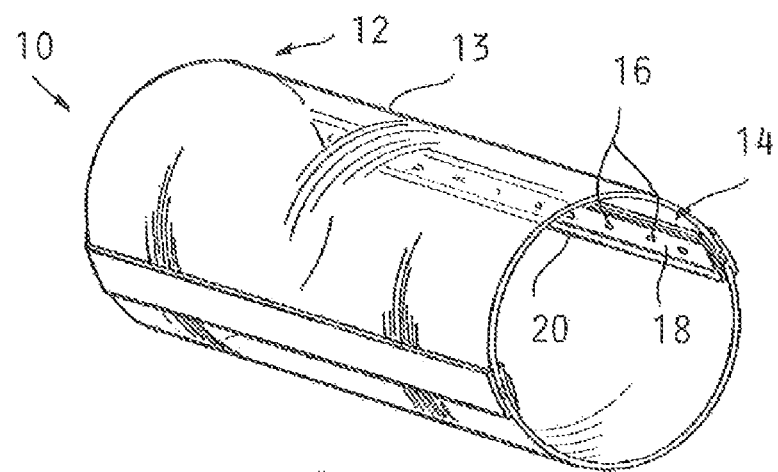
FIG. 1 is an isometric view of a transparent tube with two center-facing LED assemblies mounted along longitudinal lengths of the tube.

Embodiments of a linear distribution light emitting diode assembly are illustrated in FIGS. 1-7. The light rays illustrated in the figures are for illustrative purposes only and are not intended to accurately portray the actual dispersion of light from the LEDs. As illustrated in FIG. 1, an LED lighting unit 10 includes a tube 12 and a LED assembly 14. The tube 12 is shaped to enable the LED lighting unit 10 to be compatible with a conventional fluorescent light fixture and includes end caps for inserting the unit 10 into such a light fixture. The LED assemblies 14 extend along longitudinal lengths of the tube 12, i.e., lengths of the tube 12 parallel to the axis of the tube 12, in order to provide light to the entire length of the tube 12. The tube 12 is formed by attaching two semi-circular tube portions 13 to the LED assemblies 14. The attachment between the tube portions 13 and the LED assemblies 14 can be by way of glue, screws, snap-fit mechanisms, or other suitable attachment mechanisms known to those of skill in the art.

If, however, the LED lighting unit 10 includes only one LED assembly 14 on a circumference of the tube 12 as illustrated in FIG. 7, one tube portion 13 can extend nearly a full circle from one side of the LED assembly 14 to the other. Alternatively, the tube 12 can be a conventional fluorescent light tube with LED assemblies 14 attached to its interior as illustrated by example in FIG. 5. The attachment between the tube 12 and the LED assemblies 14 can be by way of glue, screws, snap-fit mechanisms, or other suitable attachment mechanisms known to those of skill in the art. Also, the specific shape of the tube 12 depends on the desired use of the LED lighting unit 10. For example, the tube 12 need not be an elongated shape; it can be U-shaped, toroidal, or any other shaped required by the specific application. In such a case, the one or more LED assemblies 14 would still extend parallel to the axis of the tube (that is, would still extend in a longitudinal direction), but would be shaped to be compatible with the tube 12. For example, if the tube 12 is intended to replace a conventional ring-shaped fluorescent light, the LED assemblies 14 extend longitudinally around the inner and outer circumferences of the ring-shaped tube to follow the curve of the tube 12. The tube 12 can be formed of polycarbonate, glass, acrylic, and other materials known to those of skill in the art.

Figure 2:
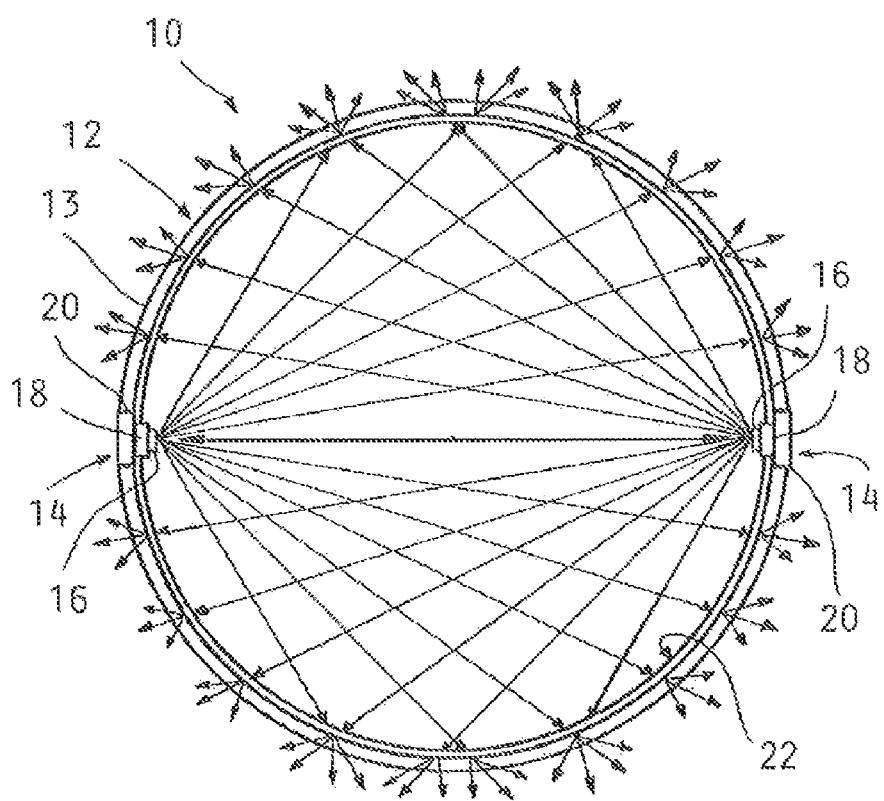
FIG. 2 is a side view of a tube with two center-facing LED assemblies mounted along longitudinal lengths of the tube.

In the illustrated FIG. 2, the tube 12 includes a diffusing surface 22. The diffusing surface 22 as illustrated is a diffusing film applied to the interior surface of the tube 12. Alternatively, the diffusing surface can include light diffusing particles in a light transmitting resin applied to the interior of a transparent tube 12. Or, instead of fixing a separate diffusing layer to a transparent tube, the tube 10 can be made of a translucent material. The tube 12 can also undergo a treatment to create a diffusing surface 22 on its interior, such as roughening the interior surface of the tube 12. Alternatively, as illustrated in FIG. 7, light extraction structures, such as ridges 32, dots, bumps, dimples, and other uneven surfaces, can be included on the interior surface of the tube 12, in which case a separate diffusing layer can be included on the exterior of the tube 12.

Each LED light assembly 14 includes a plurality of LEDs 16 and an electric circuit. The LEDs 16 included in the LED light assembly 14 emit white light. However, if desired, LEDs 16 that emit blue light, ultra-violet light or other wavelengths of light can be included. Printed circuit boards (PCB) 18 make up the electric circuitry in the illustrated embodiments. However, other types of circuit boards, for example metal core circuit boards, can be used in place of PCBs 18. Alternatively, the circuitry can be formed directly on the interior surface of the tube 12, such as by depositing copper onto the interior of the tube portions 13 before assembly. Likewise, wires can be used in place of a printed circuit board 18, so long as the LEDs 16 are electrically connected and adequately supported. When wires are used, LEDs 16 can be glued directly to a heat sink 20 or, if no heat sink is necessary in the application, to the tube 12. Because the danger of LED failure is low, the LEDs 16 can be connected in series or parallel. Heat sinks 20 are illustrated attached to each PCB 18. However, the tube portions 13 can be formed of heat-conducting plastic materials that do not require heat sinks 20. In an application where the tube 12 is arranged in a ring-shape, for example, it is desirable that the electric circuit include a flexible circuit board.

To facilitate a physical and electrical connection with a conventional fluorescent lighting fixture, end caps (not shown) are attached to each end of the tube 12. The end caps include a transformer, if necessary, and any other required electrical components. Alternatively, the electrical components can reside in a portion of the tube 12. The end caps include a necessary physical and electrical connection, such as the two-pin configuration commonly used in conventional fluorescent light fixtures. Such a structure is shown in, for example, U.S. Pat. No. 7,049,761.

In the embodiment illustrated in FIG. 2, two LED assemblies 14 are attached to longitudinal lengths of tube portions 13 to form tube 12. The LED assemblies 14 are spaced apart 180° relative to the center of the tube 12, and the LED assemblies 14 are oriented to face the center of the tube 12. While LEDs 16 emit light in multiple directions, the direction a LED 16 is said to be "facing" is determined by reference to the direction in which emitted light travels. That is, if a line were to run in the direction an LED assembly 14 is oriented to "face", an equal amount of light emitted by the LED 16 would pass on both sides of any plane including the line.

The light emitted by an LED 16 is the most concentrated in the region surrounding the direction the LED 16 faces. By placing two LED assemblies 14 on opposite sides of the tube 12 and orienting them to face the center of the tube 12, an even distribution of light around the circumference of the tube 12 is achieved because the parts of the tube 12 that receive the least amount of light from each LED assembly 14, such as the top and bottom portions of the tube 12 as shown in FIG. 2, receive light from both LED assemblies 14. The parts of the tube 12 that receive the most amount of light from each LED assembly 14, such as the area of the tube 12 in the region around where the LED 16 faces, only receive light from one LED assembly 14. Thus, in the aggregate, a similar amount of light strikes the tube 12 around its entire circumference. Further, the diffusing surface 22 provides additional bright-spot eliminating capability by diffusing the light before it exits the tube 12. While only two LED assemblies 14 are contemplated on a single circumferential path of the tube 12 in the embodiment illustrated in FIG. 2, additional LED assemblies 14 could be placed about the tube 12 for additional brightness. It is desirable but not necessary that such LED assemblies 14 be evenly-spaced about the tube 12.

Figure 3:
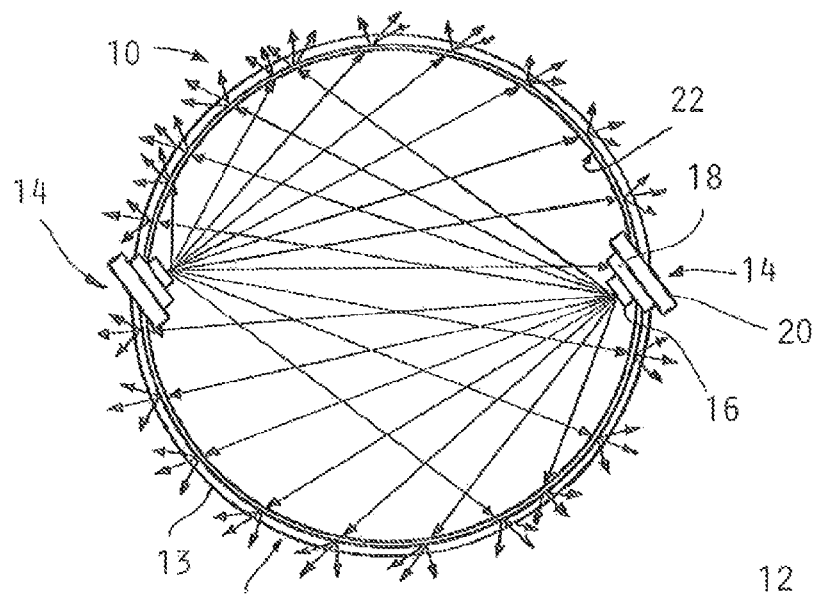
FIG. 3 is a side view of a tube with two offset LED assemblies mounted along longitudinal lengths of the tube.

A second embodiment is illustrated in FIG. 3. Here, the LED assemblies 14 are in an offset orientation; i.e., instead of facing the center of the tube 12, the LED assemblies 14 in FIG. 3 are angled slightly above and below the center of the tube 12, respectively. The LED assembly 14 orientation in the first embodiment results in some light being blocked from exiting the tube 12 by the opposing LED assembly 14. Compared to the center-facing orientation of the first embodiment, the offset orientation of the second embodiment permits an increased amount of light to exit the tube 12, resulting in an increased overall brightness of the LED lighting unit 10. The number of LED assemblies 14 around one circumference of the tube 12 and the spacing of the LED assemblies 14 can be varied from the configuration shown in FIG. 3, but it is desirable that such assemblies 14 be distributed evenly around the circumference of the tube 12 as mentioned above. Additionally, the offset angle, i.e., the angle between the direction a LED 16 faces and the center-facing direction, can be varied. The greater the offset angle, the less light is blocked by the opposing LED assembly 14. However, the trade-off of increasing the offset angle is that the light distribution becomes less even as the angle increases.

Figure 4:
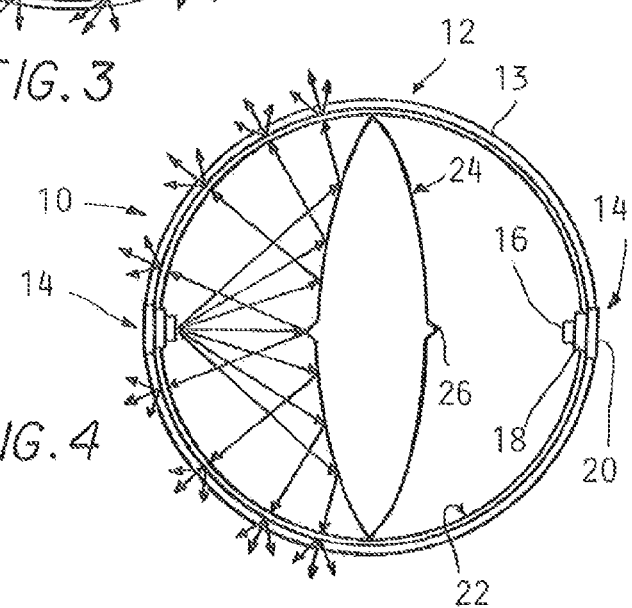
FIG. 4 is a side view of a tube with two center-facing LED assemblies and a reflecting surface positioned between the two LED assemblies.

In another embodiment, as shown in FIG. 4, a reflecting surface 24 is placed inside the tube 12. The reflecting surface 24 is made of a reflective material, such as a minor made of glass or plastic with a metallic coating on its backside, and can include a diffusing surface if desired. The reflecting surface 24 spans a diameter of the tube 12. Alternatively, the reflecting surface 24 can have a major length less than the diameter of the tube 12 and can be buttressed by brackets in the tube 12 or attached to end caps at each end of the tube 12. The reflecting surface 24 has a convex shape designed to evenly distribute light throughout an arc of the tube 12. The specific curvature of the reflecting surface 24 is dependent on the viewing angle of the LEDs 16, the distance from each LED 16 to the reflecting surface 24, and the number of LEDs 16 around the circumference of the tube 12. For example, a LED 16 with a narrow viewing angle requires a greater angle of deflection than a LED 16 with a wide viewing angle in order to achieve the same distribution of light across an arc of the tube 12. Additionally, a lip 26 projects from the reflecting surface 24 near the point where each LED 16 faces the reflecting surface 24. The lip 26 is a projection from the reflecting surface 24 that directs light around the LED assembly 14 that would otherwise be reflected off the reflecting surface 24 right back toward the LED assembly 14. Thus, the lip 26 increases the amount of light that is able to exit the tube 12, thereby increasing the brightness of the LED lighting unit 10.

Figure 5:
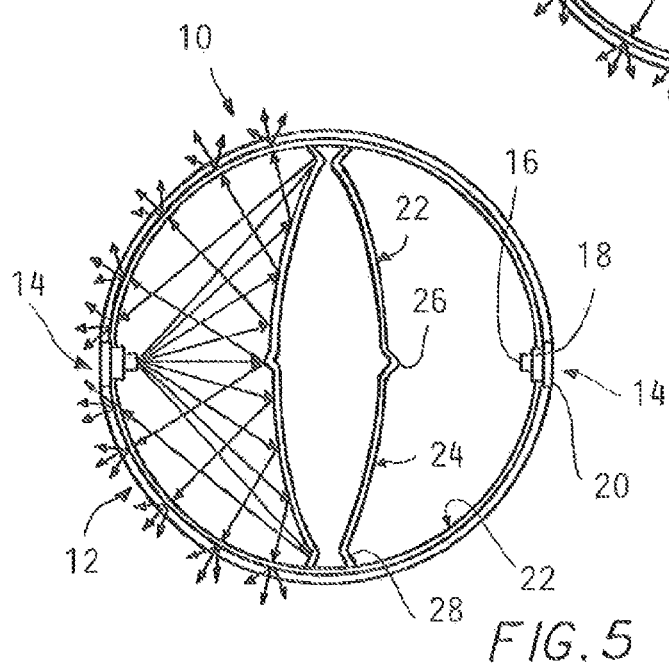
FIG. 5 is a side view of a tube similar to the tube shown in FIG. 4, but the reflecting surface has bends to direct light back toward the perimeters of the LED assemblies.

Another embodiment includes a bend 28 in the reflecting surface 24 as illustrated FIG. 5. The reflecting surface 24 in this embodiment is similar to the reflecting surface 24 in the previous embodiment, except bends 28 are disposed near the junction of the reflecting surface 24 and the tube 12. Each bend 28 is angled to direct light through the area of the tube 12 just outside the perimeter of an LED assembly 14. By directing light through the tube 12 in the vicinity of the LED assembly 14, the occurrence of dark spots created by the LED assemblies 14 is reduced. This embodiment also features a diffusing surface 22 on the reflecting surface 24.

An embodiment illustrated in FIG. 6 features at least one LED assembly 14 mounted radially to the tube 12. In this orientation, the radially-mounted LED assembly 14 faces parallel to a tangent of the tube 12 at the location the LED assembly 14 is mounted. A first end of a light pipe 30 is adjacent to each LED 16 to receive the emitted light. The pipe 30 then curves around the inside of the tube 12 until the second end of the pipe 30 is adjacent to the backside of the next LED assembly 14. The light pipe 30 tapers as it arcs around the circumference of the tube 12. The large cross section of the light pipe 30 in the vicinity of LED 16 allows a high proportion of light to arc around the tube 12 instead of exiting. As the light arcs around the tube 12 and the quantity of light in the light pipe 30 decreases due to a portion of the light exiting the tube 12, the smaller cross section of the light pipe 30 forces a higher proportion of light out of the tube 12. Thus, an even amount of light exits the tube 12 through the entire arc of the tube 12. The light pipe 30 is constructed of plastic with a metallic coating to reflect light. The light pipe 30 can also be constructed of mirrored glass. Regardless of the material selected, the light pipe 30 should have as close to total internal reflection as possible in order to maximize the brightness of the LED lighting unit 10.

The surface of the light pipe 30 in this embodiment includes light extraction structures, specifically ridges 32 as illustrated. Light extraction structures can take other shapes, such as dots, bumps, dimples, and other uneven surfaces. The size and shape of such light extracting structures can vary over a circumference and a length of the tube 12 to create a uniform distribution of light over the circumference and length of the tube 12. For example, the structures can be small and sparse near the near the LED 16 where the flux of light is high, and larger and more dense away from the LED 16 where the flux of light is low. If multiple LEDs 16 are placed around a circumference of the tube 12, there can be multiple areas around the circumference of the tube 12 that have densely spaced light extracting structures. The placement of light extracting structures is determined by software, such as the software disclosed in Michael Zollers, "Integrated Optimization Capabilities Provide a Robust Tool for LED Backlight Design," LEDs Magazine (October 2006), pp. 27-29, which is hereby incorporated by reference. The light extracting structure placement can also be determined in other ways, such as through experimentation or hand calculation. Alternatively, the surface of the light pipe 30 can be smooth; the light pipe 30 need not include light extraction structures.

If there is only one LED assembly 14 on a circumference of the tube 12, the light pipe 30 completes almost an entire rotation inside the tube 12 before ending on the opposite side of the LED assembly 14 from which it started, thereby distributing light over nearly the entire circumference of the tube 12. In operation, a portion of the light emitted by an LED 16 hits the tube 12 having an angle of incidence less the critical angle of the tube 12 and exits the tube 12, a portion hits the tube 12 having an angle of incidence equal to or greater than the critical angle of the tube 12 and is deflected back into the tube 12, and a portion initially contacts the light pipe 30. The light pipe 30 deflects the light that hits it back toward the tube 12. Thus, light rays can ricochet through an arc before exiting the tube 12, resulting in an even distribution of light through the arc.

An embodiment illustrated in FIG. 7 features a side-emitting LED 16 and a light pipe 30 similar to the light pipe 30 in the fifth embodiment. The side-emitting LED 16 emits a disc of light at approximately a right angle to the direction the LED 16 faces. The LEDs 16 abut the tube 12 such that the LEDs 16 emit light parallel to a local tangent of the tube 12. In this embodiment, the circuit board 18 and heat sink 20 are mounted below the LED 16 on the interior of the tube 12. Alternatively, the circuit board 18 and heat sink 20 can be mounted on the outside of the tube 12. The light pipe 30 curves around the inside of the tube 12, extending from one side of the LED 16 to the other and forming a channel between the tube 12 and the light pipe 30. The light pipe 30 is tapered such that the portion of the light pipe 30 furthest from the LED 16 is closest to the tube 12. The tapered shape of the light pipe 30 causes a high proportion of light to exit the tube 12 when the quantity of light is low and results in an even distribution of light around the circumference of the tube 12. Thus, light exits the side of the LED 16 and curves around a circumference of the tube 12, reflecting between the tube 12 and the light pipe 30 until the light strikes the tube 12 at an angle less than the critical angle and exits the tube 12. Alternatively, multiple LED assemblies 14 can be disposed about the circumference of the tube 12, in which case a light pipe 30 extends between each of the LED assemblies 14. Also, light extracting structures can be placed on the light pipe 30 as discussed in the previous embodiment.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An LED lighting unit for replacing a conventional fluorescent bulb of a conventional fluorescent lighting fixture comprising:
   a tubular housing including at least one tube portion; and
   a plurality of LED assemblies spaced about a circumference of the tubular housing and extending in a longitudinal direction along the tubular housing; and wherein each of the plurality of LED assemblies includes a plurality of LED devices mounted on a respective mounting surface, and each mounting surface is angled offset from a tangent of the tubular housing that is centered at a mounting location of that mounting surface.

2. The LED lighting unit of claim 1, wherein the plurality of LED assemblies comprises a first LED assembly and a second LED assembly spaced 180° apart about the circumference of the tubular housing.

3. The LED lighting unit of claim 1, further comprising a reflecting surface inside the tubular housing.

4. The LED lighting unit of claim 3, wherein the reflecting surface spans a diameter of the interior of the tube wherein an equal number of LED assemblies are located on the circumference of the tubular housing on each side of the diameter.

5. The LED lighting unit of claim 4, wherein the reflecting surface includes a diffusing surface.

6. The LED lighting unit of claim 1, wherein each tube portion has an arc-shaped cross-section, a transparent outer layer, a diffusing interior layer, and is made of at least one of polycarbonate, acrylic and glass.

7. The LED lighting unit of claim 6, further comprising:
a first semicircular tube portion attached to a first LED assembly and a second LED assembly of the plurality of LED assemblies; and
a second semicircular tube portion attached to the first LED assembly and the second LED assembly.

8. The LED lighting unit of claim 1, further comprising:
a heat sink attached to each of the plurality of LED assemblies.

9. The LED lighting unit of claim 1, wherein the tubular housing includes one tube portion having a circular cross-section.

10. The LED lighting unit of claim 1, wherein each mounting surface includes a circuit board.

11. The LED lighting unit of claim 1 wherein the tubular housing comprises a single tubular housing having an inner surface and the plurality of LED assemblies is equidistantly spaced about the inner surface of the tubular housing.

12. The LED lighting unit of claim 1 wherein each of the plurality of LED devices is mounted on its respective mounting surface so that its emitted light is oriented to face away from an exterior of the tubular housing at the mounting location of that mounting surface.

13. An LED lighting unit for replacing a conventional fluorescent tube of a conventional fluorescent lighting fixture comprising:
a tubular housing including at least one tube portion and a hollow center;
at least one LED assembly including a plurality of LEDs on a mounting surface, each LED assembly mounted to a longitudinal length of the tubular housing with the mounting surface oriented such that an emitting direction of the plurality of LEDs is parallel to a tangent of the tubular housing, the tangent of the tubular housing being centered at a mounting location of the mounting surface respectively associated with each of the at least one LED assembly; and
a light pipe associated with each LED assembly and having an opening extending radially from an inner surface of the tubular housing, the opening facing the emitting direction of the plurality of LEDs, and the light pipe curving inside the inner surface of the tubular housing and about at least a portion of the hollow center.

14. The LED lighting unit of claim 13, wherein each LED assembly includes a circuit board mounted radially to the longitudinal length of the tubular housing.

15. The LED lighting unit of claim 13, wherein each LED assembly includes a side-emitting LED.

16. The LED lighting unit of claim 13, wherein the surface of the light pipe includes a plurality of light extracting structures.

17. The LED lighting unit of claim 16, wherein the density of light extracting structures on the interior surface of the tubular housing varies over an arc of the light pipe.

18. The LED lighting unit of claim 13, further comprising:
a plurality of light extracting structures on the interior surface of the tubular housing; and
a diffusing layer on the exterior of the tubular housing.

19. The LED lighting unit of claim 13, further comprising a plurality of LED assemblies equidistantly spaced about the hollow center.

* * * * *